US008075933B2

(12) United States Patent
Domazakis

(10) Patent No.: US 8,075,933 B2
(45) Date of Patent: Dec. 13, 2011

(54) METHOD FOR THE PREPARATION OF FERMENTED DRY OR SEMI-DRIED MEAT PRODUCTS, WITH PARTIAL SUBSTITUTION OF THE ANIMAL FAT AND DIRECT INCORPORATION OF OLIVE OIL

(75) Inventor: Emmanouil Domazakis, Rethymnon (GR)

(73) Assignee: Creta Farm Societe Anonyme Industrial and Commercial, Rethymnon (GR)

( * ) Notice: Subject to any disclaimer, the term of this patent is extended or adjusted under 35 U.S.C. 154(b) by 170 days.

(21) Appl. No.: 10/577,812

(22) PCT Filed: Oct. 18, 2004

(86) PCT No.: PCT/GR2004/000050

§ 371 (c)(1),
(2), (4) Date: Apr. 28, 2006

(87) PCT Pub. No.: WO2005/034652

PCT Pub. Date: Apr. 21, 2005

(65) Prior Publication Data

US 2007/0104835 A1 May 10, 2007

(30) Foreign Application Priority Data

Oct. 17, 2003 (GR) .................................. 030100425

(51) Int. Cl.
*A23L 1/31* (2006.01)
(52) U.S. Cl. ............................................ 426/55; 426/59
(58) Field of Classification Search .................... 426/55, 426/412, 513, 516, 646, 804, 284, 59
See application file for complete search history.

(56) References Cited

U.S. PATENT DOCUMENTS

| 2,060,422 A * | 11/1936 | McKee et al. ................. 426/518 |
| 4,147,807 A * | 4/1979 | Gryczka et al. ................ 426/56 |
| 5,238,701 A | 8/1993 | Dubanchet |
| 5,773,057 A | 6/1998 | Singh |
| 2003/0049364 A1 | 3/2003 | Domazakis |

FOREIGN PATENT DOCUMENTS

| GB | 2243528 A | 11/1991 |
| GR | 3031707 T3 | 2/2000 |
| WO | WO 02/065860 A1 * | 8/2002 |

OTHER PUBLICATIONS

Bloukas, J.G. et al, "Effect of replacing port backfat with olive oil on processing and quality characteristics of fermented sausages"; Meat Science, vol. 45, No. 2, pp. 133-144.*
www.sonoma sausage.com, Jul. 28, 2003, p. 1 Date verified by web from www.archive.org, attached printout, p. 1.*
Bloukas, J.G. et al, "Effect of replacing port backfat with olive oil on processing and quality characteristics of fermented sausages"; Meat Science, vol. 45, No. 2, pp. 133-144, 1996.
Vural H, "Effect of replacing beef fat and tail fat with interestified plant oil on quality characteristics of Turkish semi-dry fermented sausages." European Food Research and Technology, vol. 217, No. 2, Aug. 2003, pp. 100-103.
Severini, Carla et al, "Partial substitution of pork backfat with extra-virgin olive oil in 'salami' products: Effects on chemical, physical and sensorial quality." Meat Science, vol. 64, No. 3, Jul. 2003, pp. 323-331.
E. Muguerza, G. Fista, D. Ansorena, I. Astiasaran, J.G. Bloukas, Effect of fat level and partial replacement of pork backfat with olive oil on processing and quality characteristics of fermented sausages, Meat Science, 2002, pp. 397-404, vol. 61.
Henk Hoogenkamp, Regional variations on fermented sausage, Meat International, 1998, pp. 33-36, vol. 8, No. 5.

* cited by examiner

*Primary Examiner* — Jyoti Chawla
(74) *Attorney, Agent, or Firm* — Husch Blackwell LLP

(57) ABSTRACT

Method for the preparation of fermented dry or semi-dried meat products, with partial substitution of the animal fat and direct incorporation of olive oil Method for the preparation fermented dry or semi-dried meat products, with direct incorporation of olive oil. The said method includes the following phases: (a) mixing of the meat with cultures, sugars, preservatives and auxiliary salts, (b) admixture of olive oil and fat, (c) mixing until the desirable meat-fat grain is achieved, (d) stuffing of the meat paste in casings, (e) fermenting of the product in a chamber with relative humidity 95-80% and temperature of 25-20° C., (f) dehydration in a chamber 10 with relative humidity 80-75% and temperature 12-17° C. For the partial fermenting process products, the stages (e) and (f) are modified as follows: (e') fermenting of the product in a chamber with relative humidity 75-60% and temperature of 25-30° C. for 24-30 hours, (f') heating of the product up to core temperature of 55° C. and dehydration with relative humidity 75-80 % and temperature of 12-17° C. The fermented dry and semi-dried meat products with direct incorporation of olive oil, which are produced according to this method, have excellent stability from a structure point of view (consistency) and keep the physical and chemical characteristics of the olive oil.

4 Claims, No Drawings

METHOD FOR THE PREPARATION OF FERMENTED DRY OR SEMI-DRIED MEAT PRODUCTS, WITH PARTIAL SUBSTITUTION OF THE ANIMAL FAT AND DIRECT INCORPORATION OF OLIVE OIL

This application claims the benefit of PCT patent application Ser. No. PCT/GR2004/000050, filed Oct. 18, 2004, which is now International Publication Number WO 2005/034652, published Apr. 21, 2005, which claims priority to GR 20030100425, filed Oct. 17, 2003.

The present invention relates to a method of production for dry or semi-dry fermented meat products, with direct incorporation of olive oil, with the following principal characteristics:

1. the use of olive oil replacing part of the added animal fat
2. the use of fatless skeletal (bone and muscle) tissue.
3. the implementation of the appropriate technological procedures and processes in order to:
    Achieve a solid meat paste of stable composition and structure, capable of being subjected to a fermentation process followed by dehydration (drying), with the purpose of incorporating olive oil and the stable composition of that.
    Achieve the maximum possible keep ability of the organoleptic, physical, chemical, and nutritional characteristics of the differentiating distinguished factor (said olive oil).

The fermenting process products (dry meat products: air-cured, sujuk sausages, etc) after stuffing in to synthetic or natural casings, they are subjected to the appropriate dehydration in natural or artificial environment, and, possibly, to smoking. The partial fermentation process products (semi-dry products: beer salami—beerwurst, etc), after being subjected to partial fermentation in appropriate environment, they are, subsequently, subjected to heat treatment and, possibly, to smoking.

The meat products of this category are characterized by two technological features, the fermentation and the dehydration (loss of water up to a certain percentage). Both characteristics play an important role in the conservation & preservation of these products, as well as in their quality, since the organoleptic properties (taste, flavour, odour, colour, consistency) and the shearing depend on these processes.

The dry products form a distinct category of products with defined structure and composition, which has been accepted by the consumers for their fatty appearance, their spicy taste and their particular flavour.

Nowadays, the increasing needs for wholesome, healthy nutrition & diet and the consumers' wish to enjoy low-fat products became the starting point for the research aiming to produce dry or semi-dry meat products with the addition of vegetable fats (olive oil) and the decrease of the added animal fat.

The fermentation of the dry products is, basically, a biological phenomenon, i.e. it is due to the growth and activity of various micro-organisms. There are micro organisms (*Lactobacillus, Staphylococcus, Micrococcus*), which are useful or necessary for the fermentation process of the meat mass. On the other hand and there are such pseudomonadaceae, enterobacteriaceae, which are harmful, because they cause alteration or severe changes in the properties of the product or they are pathogenic to humans. The decrease of the pH <5 of the product, which is obtained by decrease of the humidity of the meat mass (dehydration) prevent the growth of the non-desirable micro-organisms.

The incorporation of oil, in comparison with the traditional addition of pork fat, since this is attempted with the use of conventional techniques, it is presented with instability problems or there is a destabilization tendency not only of the meat mass, but also of the final product, which usually presents the phenomenon of oily extractions.

Until now, the patented researches and applications in the meat industry concerned meat-based products and the incorporation of olive oil in these, due to heat treatment. For these products, a different flowchart is followed and the products are subjected to heat treatment during which the pasteurisation and the denaturation of the proteins are the most significant factors for the stability of the final product.

There are, also, known patented techniques of indirect incorporation of vegetable fats. However, these techniques include a preliminary heat treatment procedure at temperature levels of 100° C.

Especially in the case of olive oil, the role of which in the human nutrition is distinct between the seed oils and other vegetable oils, as well as internationally acknowledged for the beneficial characteristics of its individual natural compounds (reference is made to the Omega fatty acids and their protective role, the low cholesterol and polyphenols and their role), with the cold mixing the olive oil conserves its beneficial characteristics unaltered.

It is considered appropriate on one hand, the admixing of the olive oil as an ingredient replacing part of the animal fat, in fermented or in partial fermented process products, to be carried out under particularly protective conditions, so as to ensure the maximum possible transfer of the properties to the host product.

On the other hand, with the process of incorporation of the olive oil, to ensure the traditional technique for producing dry or semi-dry meat products, where scientific data will be taken systematically into consideration. These data are based on the properties of the proteins of the meat and the olive oil, and on the properties of their mixture based on the individual properties of the said ingredients.

It should be taken into consideration that the stability of the meat products is influenced significantly by:
    The pH of the meat paste (initial pH and the decrease rate of this)
    The initial microbiological load of the meat paste
    The origin and the composition of the fat to be incorporated in the product
    The physical and chemical properties, such as
        the profile of the fatty acids (type and degree of saturation)
        the SFI (solid fat index)
        the PUFA (polyunsaturated fatty acids), MUFA (monounsaturated fatty acids)/SFA (saturated fatty acids) ratio at the applied temperatures in the various production phases It is evident that, from a technological point of view, the differences between pork fat and olive oil should be taking into consideration in the preparation of a stable meat paste during the products' maturing and dehydration phases.

Olive oil is a low pH product, which does not hinder the fermenting of the product; on the contrary, it contributes to the acceleration of the dehydration since it causes denaturation of the meat's proteins leading to humidity elimination. Nevertheless, the excessive quantity of olive oil has negative results, due to the fact that it causes rapid decrease of the pH and fast denaturation of the proteins, which obstructs the creation of a lattice between the extracted muscular albumen and the fat on which depend the consistency and the shearing capacity of the final product.

The olive oil is a product with minimum number of microbial growth (bacteria); due to its low acidity and its low water activity (available water—aw), it does not allow the development of micro-organisms. This fact contributes to the fermenting of the products because it does not affect the initial number of micro-organisms of the meat paste and, thus, the competitive non-desirable microbial growth.

The characteristics of the dry or semi-dry products with admixture of olive oil require incorporation of the olive oil under specific conditions:
- in generating the maximum possible incorporation of the oil by means of mechanical processes (mixing, homogenisation of the participating compounds)
- in the calculation of the ideal quantitative ratio between these compounds, in order to ensure the maximum possible adsorption and conservation of the oil in the product, in parallel with the creation of the appropriate physical and chemical conditions that will allow for the proper maturing of the products, the stability and the shearing capacity of the final product. The calculated quantity of added fat must not exceed 10%.
- in the creation of the appropriate fermenting and dehydration conditions that will contribute to the proper dehydration of the meat mass with the mixed olive oil and to the proper fermentation of the products, with the development of the desirable micro-organisms.

Thus, the present invention provides a method for producing fermented dry meat products with direct incorporation of olive oil:

Meat at a temperature of −4° C. is mixed with the starter culture (of desirable micro-organisms), sugars, seasonings (e.g. oregano, pepper, paprika, spice) and the auxiliary salts (e.g. salt, nitrates, ascorbate salt) in the mixer. When the temperature of the mixture rises to −2° C., the olive oil and the quantity of fat are added in it. The mixing continues till the desirable meat-fat grain is achieved. The mixture is, then, led to a stuffing machine where it is stuffed in casings under vacuum conditions (1000 mbar) and with a power demand of 7 kW.

Subsequently, it is led to the maturation chamber. These special chambers are equipped with automatic systems for the control and regulation of the relative humidity and temperature. During the first days, the relative humidity varies between 95% and 80%, at a temperature from 25 to 20° C. and the velocity of the air is 0.5-0.8 m/sec. The fermenting of the product lasts for a period of some weeks to a few months, depending on the diameter of the product. After that, the meat products (sausages, etc) are transferred to special dehydration chambers. They remain in these chambers until they have undergone the desirable dehydration, their colour is stabilised and the desirable odour and flavour are developed. The relative humidity in these chambers is 80-75%, the temperature is 12-17° C. and the velocity of the air is 0.5-0.1 m/sec.

And a method for producing fermented semi-dry meat products with direct incorporation of olive oil:

Meat at a temperature of −4° C. is mixed with the starter culture (of desirable micro-organisms), sugars, seasonings (e.g. oregano, pepper, paprika, spice) and the auxiliary salts (e.g. salt, nitrates, ascorbate salt) in a mixer. When the temperature of the mixture rises to −2° C., the olive oil and the quantity of fat are added in it. The mixing continues till the desirable meat-fat grain is achieved. The mixture is, then, led to a stuffing machine where it is stuffed in casings under vacuum conditions (1000 mbar) and with a power demand of 7 kW.

Subsequently, it is led to the maturation chamber. These special chambers are equipped with automatic systems for the control and regulation of the relative humidity and temperature. The relative humidity varies between 75% and 60%, at a temperature from 25 to 30° C. and the velocity of the air is 0.5-0.8 m/sec. The fermenting of the product lasts from 24 to 30 hours. Then the meat products (sausages, etc) are heated at core temperature of 55° C. The duration of the heat treatment varies between 0.5 and 2 hours and depends on the diameter of the products. After that, the meat products are transferred to special dehydration chambers. They remain in these chambers until they have undergone the desirable dehydration, their colour is stabilised and the desirable odour and flavour are developed. The relative humidity in these chambers is 80-75%, the temperature is 12-17° C. and the velocity of the air is 0.5-0.1 m/sec.

The dry or semi-dry meat products with olive oil, which are produced according to the present invention, have excellent stability from a structure point of view (consistency) due to the use of fatless, lean meat, the application of low temperatures and their preparation under vacuum conditions. The physical and chemical characteristics of the olive oil contained in these products remain unaltered, due to low temperatures applied during the production process.

The invention claimed is:

1. Method for the preparation of fermented meat products in which liquid olive oil is stably incorporated to replace part of added animal fat, comprising the following steps:
   (a) Meat at −4° C. is first mixed with salt, sugars, preservative, auxiliary salts and cultures;
   (b) Then, liquid olive oil and animal fat are added in the resulting mixture at −2° C., wherein the liquid olive oil replaces part of the animal fat to be added;
   (c) Mixing continues until the desirable meat and fat grain is achieved;
   (d) Subsequently, the resulting mixture is led to stuffing machines, where it is stuffed in casings under vacuum conditions of about 1000 mbar;
   (e) The resulting meat products are then led to maturation chambers with an adjustable relative humidity of 95-80%, a temperature of 25-20° C., and an air velocity of 0.5-0.8 m/sec; with the time of stay in the maturation chamber depending upon on the size of the resulting meat products; and
   (f) The resulting meat products are led to a dehydration chamber with an adjustable relative humidity of 80-75%, a temperature of 12-17° C., and an air velocity 0.5-0.1 m/sec.

2. Fermented meat products with incorporated liquid olive oil produced according to the method of claim 1.

3. Method for the preparation of partially fermented meat products in which liquid olive oil is stably incorporated to replace part of added animal fat, comprising the following steps:
   (a) Meat at −4° C. is first mixed with salt, sugars, preservative, auxiliary salts and cultures;
   (b) Then, liquid olive oil and animal fat are added in the resulting mixture at −2° C., wherein the liquid olive oil replaces part of the animal fat to be added;
   (c) Mixing continues until the desirable meat and fat grain is achieved;
   (d) Subsequently, the resulting mixture is led to stuffing machines, where it is stuffed in casings under vacuum conditions of about 1000 mbar;
   (e) The resulting meat products are then led to a maturation chamber with adjustable relative humidity of 60-75%, a temperature of 25-30° C., and an air velocity 0.5-0.8 m/sec, wherein the fermentation lasts 24 hours; and
   (f) The resulting meat products are then heated to a core temperatures of 55° C. and are led to a dehydration chamber with an adjustable relative humidity of 80-75%, a temperature of 12-17° C., and an air velocity 0.5-0.1 m/sec.

4. Partially fermented meat products with incorporated liquid olive oil produced according to the method of claim 3.

* * * * *